(12) United States Patent
Zeng (10) Patent No.: US 10,174,885 B2
(45) Date of Patent: Jan. 8, 2019

(54) LIGHT BAR AND BACKLIGHT MODULE

(71) Applicant: Wuhan China Star Optoelectronics Technology Co., Ltd., Wuhan, Hubei (CN)

(72) Inventor: Jie Zeng, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 117 days.

(21) Appl. No.: 14/781,417

(22) PCT Filed: Jun. 30, 2015

(86) PCT No.: PCT/CN2015/083006
§ 371 (c)(1),
(2) Date: Sep. 30, 2015

(87) PCT Pub. No.: WO2016/192166
PCT Pub. Date: Dec. 8, 2016

(65) Prior Publication Data
US 2017/0146201 A1    May 25, 2017

(30) Foreign Application Priority Data
Jun. 2, 2015  (CN) .......................... 2015 1 0297119

(51) Int. Cl.
*F21K 9/64*   (2016.01)
*F21S 4/20*   (2016.01)
(Continued)

(52) U.S. Cl.
CPC .................. *F21K 9/64* (2016.08); *F21S 4/20* (2016.01); *F21V 9/30* (2018.02); *F21V 17/06* (2013.01);
(Continued)

(58) Field of Classification Search
CPC ...... F21K 9/64; F21S 4/20; F21V 9/16; F21V 17/06; F21Y 2113/13; F21Y 2103/10; F21Y 2215/10
(Continued)

(56) References Cited

U.S. PATENT DOCUMENTS

2011/0141769 A1* 6/2011 Lee ...................... G02B 6/0023
362/629
2013/0002985 A1* 1/2013 Hosoki ............. G02F 1/133615
349/65
(Continued)

FOREIGN PATENT DOCUMENTS

CN        102209432 A     10/2011
CN        202171155 U      3/2012
(Continued)

*Primary Examiner* — Anh Mai
*Assistant Examiner* — Jessica M Apenteng
(74) *Attorney, Agent, or Firm* — Andrew C. Cheng (57) ABSTRACT

The present invention provides a light bar and a backlight module. The light bar comprises a circuit board, a plurality of light sources, a quantum tube and a first tape, and the circuit board is employed to generate a control signal, and the light sources are located on the circuit board and electrically connected to the circuit board, and the light sources generate a first light under control of the control signal, and the first light emitted from the light sources exits through an illuminating surface of the light sources, and the quantum tube is located adjacent to the illuminating surface of the light sources and the quantum tube is fixed and connected with the circuit board with the first tape, and the quantum tube is employed to convert the first light emitted from the light sources into a second light.

10 Claims, 7 Drawing Sheets

(51) Int. Cl.
   *F21V 9/30*      (2018.01)
   *F21V 17/06*     (2006.01)
   *F21Y 113/13*    (2016.01)
   *F21Y 103/10*    (2016.01)
   *F21Y 115/10*    (2016.01)
   *F21V 8/00*      (2006.01)

(52) U.S. Cl.
   CPC ....... *F21Y 2103/10* (2016.08); *F21Y 2113/13* (2016.08); *F21Y 2115/10* (2016.08); *G02B 6/0068* (2013.01)

(58) Field of Classification Search
   USPC ........................................... 362/84, 600–634
   See application file for complete search history.

(56) References Cited

U.S. PATENT DOCUMENTS

2013/0050612 A1* 2/2013 Hur .................. G02F 1/133603
                                                         349/62
2014/0160727 A1* 6/2014 Hyun ........................ F21V 9/16
                                                         362/84

FOREIGN PATENT DOCUMENTS

| CN | 102954408 A | 3/2013 |
| CN | 103487990 A | 1/2014 |
| CN | 103511921 A | 1/2014 |
| CN | 104456191 A | 3/2015 |
| CN | 104503135 A | 4/2015 |
| CN | 104613384 A | 5/2015 |

* cited by examiner

LIGHT BAR AND BACKLIGHT MODULE

CROSS REFERENCE

This application claims the priority of Chinese Patent Application No. 201510297119.4, entitled "Light bar and backlight module", filed on Jun. 2, 2015, the disclosure of which is incorporated herein by reference in its entirety.

FIELD OF THE INVENTION

The present invention relates to a display field, and more particularly to a light bar and a backlight module.

BACKGROUND OF THE INVENTION

The Liquid Crystal Display is a common display device, and possesses properties of low power consumption, small volume and light weight. Therefore, it has been favored by the users. Generally, the Liquid Crystal Display comprises a backlight module and a display panel. The backlight module is employed to provide an area light source for the display panel. According to the different light source incident positions, the backlight module can be categorized into two kinds, the side light type backlight module and a direct light type backlight module. In the direct light type backlight module, the light source, such as the Cold Cathode Fluorescent Lamp (CCFL) or the Light Emitting Diode (LED) is located behind the liquid crystal panel to directly form an area light source provided for the display panel. In the side light type backlight module, the light emitting diode light bar is located at the edges of the back plate behind the display panel. The light emitted by the light emitting diode light bar enters the light guide plate through one side of the light guide plate. After being reflected and diffused, the light exiting from the illuminating surface of the light guide plate and is provided for the display panel. However, with the higher and higher requirement of the display quality for the liquid crystal display device from the users, and for promoting the color saturation of the image, the chromaticity of the light bar in the backlight module is improved to promote the color saturation of the image. In prior art, the technical result of improving the chromaticity of the light bar in the backlight module can be improved by locating the quantum bar in the backlight module. However, the installation of the quantum bar needs the particular installation condition, the traditional installation of the Cold Cathode Fluorescent Lamp or the Light Emitting Diode does not apply for the installation of the quantum bar.

SUMMARY OF THE INVENTION

The present invention provides a light bar, wherein the light bar comprising a circuit board, a plurality of light sources, a quantum tube and a first tape, and the circuit board is employed to generate a control signal, and the light sources are located on the circuit board and electrically connected to the circuit board, and the light sources generate a first light under control of the control signal, and the first light emitted from the light sources exits through an illuminating surface of the light sources, and the quantum tube is located adjacent to the illuminating surface of the light sources and the quantum tube is fixed and connected with the circuit board with the first tape, and the quantum tube is employed to convert the first light emitted from the light sources into a second light.

The first tape is a double-side tape, and the quantum tube comprises a lateral side, and a one side of the first tape is adhered at the lateral side of the quantum tube, and the other side is adhered to the circuit board.

A width of the first tape is larger than a width of the lateral side of the quantum tube.

A gap is arranged between the illuminating surface of the light sources and the quantum tube.

The light sources are blue light emitting diodes, and the first light is blue light, and the first light is employed to excite the quantum tube to generate red, green lights, and the blue light emitted by the light sources and the red, green lights generated by exciting the quantum tube are mixed to generate the second light which is white light.

The light bar further comprises a second tape, and the second tape is a double-side tape, and the second tape is located on a surface of the quantum tube away from the light sources.

An appearance of the quantum tube is one of semicircle, triangle and rectangle.

The first tape is a single-side tape, and the quantum tube comprises a first end and a second end which are oppositely located, and the first tape is located corresponding to the first end and the second end, and an adhesive side of the first tape surrounds a surface of the quantum tube away from the illuminating surface of the light sources and is attached on the circuit board.

The light bar comprises a plurality of silk screens, and the silk screens are located at edges of the circuit board, and each silk screen is located corresponding to the light source.

Besides, the present invention further provides a backlight module, and the backlight module comprises either of aforesaid embodiments of the light bars.

In comparison with prior arts, the light bar of the present invention and the backlight module comprising the light bar fix the quantum tube on the circuit board with the first tape. The detachment of the quantum tube is convenient while fixing the quantum tube for rework and reassembly when issues occur to the light bar.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
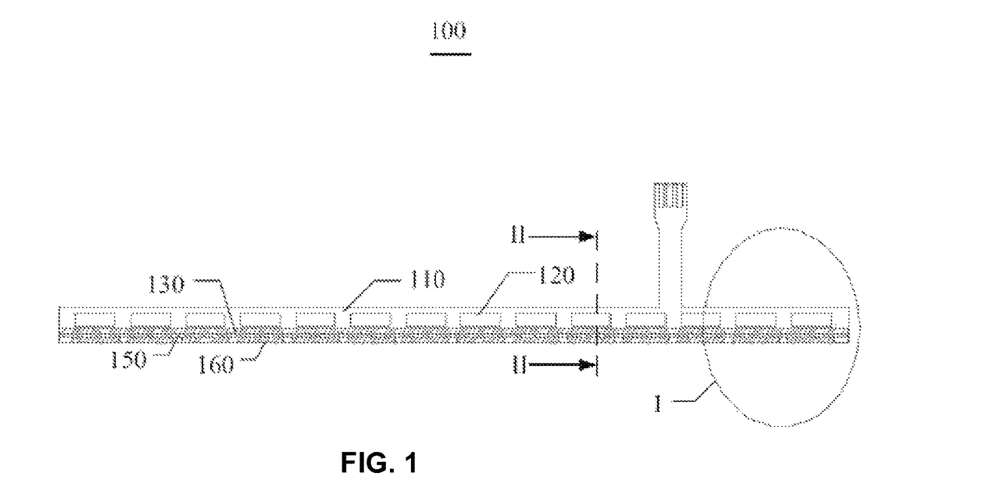
FIG. 1 is a structural diagram of a light bar according to a preferred embodiment of the present invention.
Figure 2:
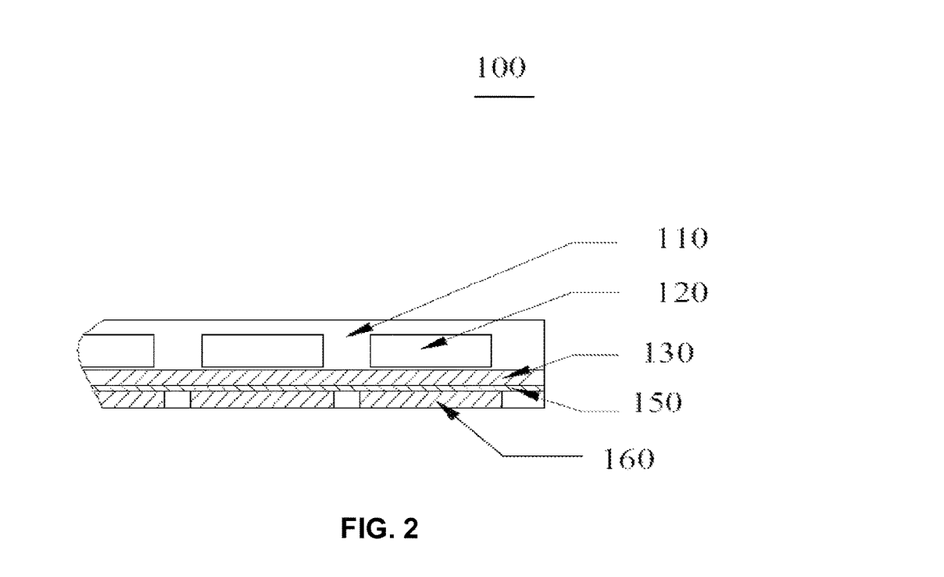
FIG. 2 is a partially enlarged structure diagram in I position in FIG. 1.
Figure 3:
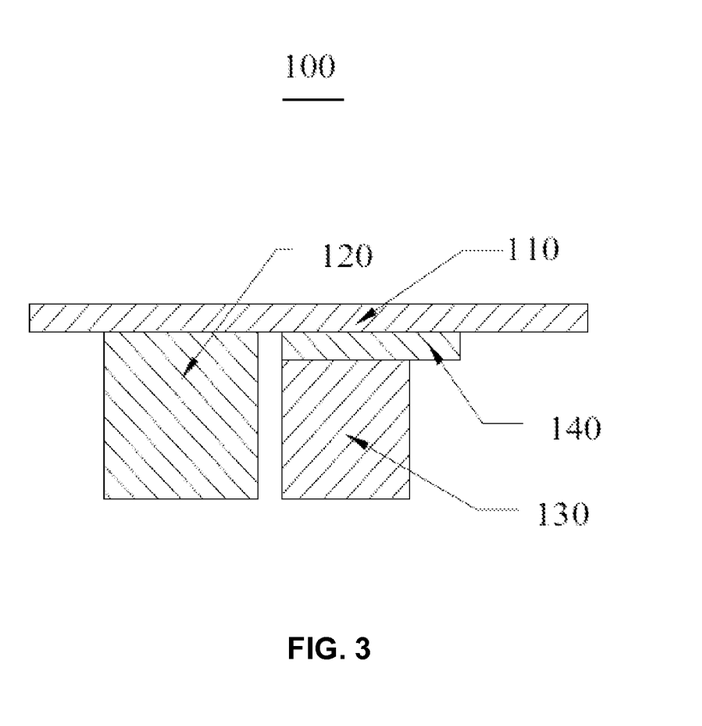
FIG. 3 is a sectional structure diagram along the II-II line in FIG. 1.

Please refer to FIG. 1, FIG. 2 and FIG. 3. FIG. 1 is a structural diagram of a light bar according to a preferred embodiment of the present invention; FIG. 2 is a partially enlarged structure diagram in I position in FIG. 1; FIG. 3 is a sectional structure diagram along the II-II line in FIG. 1. The light bar 100 comprises a circuit board 110, a plurality of light sources 120, a quantum tube 130 and a first tape 140. The circuit board 110 is employed to generate a control signal, and the light sources 120 are located on the circuit board 110 and electrically connected to the circuit board 110, and the light sources 120 generate a first light under control of the control signal, and the first light emitted from the light sources 120 exits through an illuminating surface of the light sources 120. The quantum tube 130 is located adjacent to the illuminating surface of the light sources 120 and the quantum tube 130 is fixed and connected with the circuit board 110 with the first tape 140, and the quantum tube 130 is employed to convert the first light emitted from the light sources 120 into a second light.

The circuit board 110 can be a Printed Circuit Board (PCB) or a Flexible Printed Circuit Board (FPC). The circuit board 110 can support and fix the light sources 120 while providing the control signal for the light sources 120.

The light sources 120 are located on the circuit board 110. Preferably, the light sources 120 are aligned in a straight line. The interval between adjacent light sources 120 are squally distributed. Thus, the first light emitted from the light sources 120 can be mixed more uniform as entering the quantum tube 130.

Figure 4:
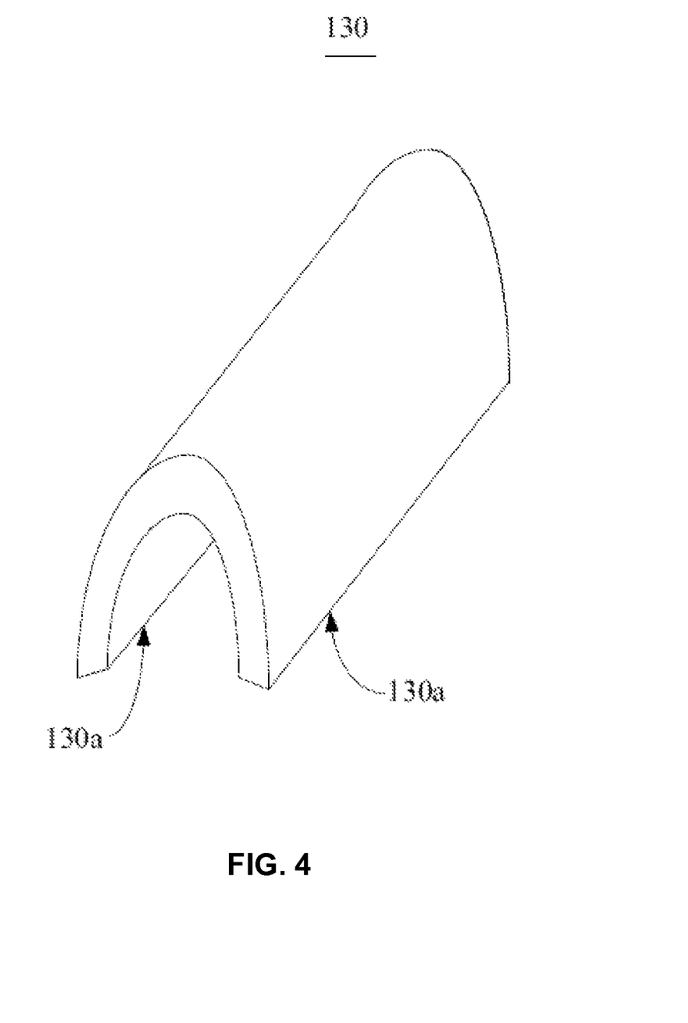
FIG. 4 is a structural diagram of a quantum tube according to a preferred embodiment of the present invention.

Please refer to FIG. 4. FIG. 4 is a structural diagram of a quantum tube according to a preferred embodiment of the present invention. In this embodiment, the sectional appearance of the quantum tube 130 is an U shape. The quantum tube 130 comprises two lateral sides 130a which are oppositely located. Correspondingly, the first tape 140 is a double-side tape, and a one side of the double-side tape is adhered at the lateral side 130a of the quantum tube 130, and the other side of the double-side tape is adhered to the circuit board 110. Preferably, a width of the first tape is larger than a width of the lateral side of the quantum tube 130 to fix the quantum tube 130 on the circuit board 110 in a better condition.

The quantum tube is to utilize transparent material, such as glass to seal the quantum dots and thus form a quantum tube. By irradiating the quantum tube with the light, the quantum dots inside the quantum tube can generate pure color light with high chromaticity. The light emitted from the light source and the pure color light with high chromaticity which is excited inside the quantum tube are mixed to generate the while light with high chromaticity. The quantum dots are employed to convert the light generated by the light emitting diode into visible light or infrared light. The quantum dots are nanocrystals of which the diameters are smaller than bulk exciton Bohr radius. Due to the quantum confinement effect, the energy difference among the electronic states of the quantum dots is a function of the components and physical dimensions of the quantum dots. Therefore, the optical and optoelectronics properties of the quantum dots can be tuned and adjusted by changing the physical dimensions of the quantum dots. The quantum dots can absorb all wavelengths of which the peak wavelengths are shorter and emits light with longer wavelength. 2 nm CdSe quantum dot can emit light in blue region of the visible light, and 10 nm CdSe quantum dot can emit light in red region of the visible light. As the quantum dot is applied to the display technology, the quantum dots can be utilized to emit spectrally concentrated, very pure, high quality red/green mono lights, which completely surpass the phosphor property of the traditional light emitting diode backlight and realize better image colors. Therefore, the quantum dot display technology is considered to be the best solution of high performance, high display color gamut in the future, and even the new technical representative of the global display industry.

It is understandable that in this embodiment, U shape is illustrated for being the sectional appearance of the quantum tube 130 but the appearance of the quantum tube 130 is not restricted to be U shape. In other embodiment, the appearance of the quantum tube 130 can be one of semicircle, triangle and rectangle.

Preferably, a gap is arranged between the illuminating surface of the light sources 120 and the quantum tube 130 to make that the light emitted from the illuminating surface of the light sources 120 is incident into the quantum tube 130 after light mixture.

In this embodiment, the light sources 120 are blue light emitting diodes, and the first light emitted by the light sources 120 is blue light, and the first light is employed to excite the quantum tube 130 to generate red, green lights, and the blue light emitted by the light sources 120 and the red, green lights generated by exciting the quantum tube 130 are mixed to generate the second light which is white light.

Preferably, the light bar 100 further comprises a second tape 150, and the second tape 150 is a double-side tape, and the second tape 150 is located on a surface of the quantum tube 130 away from the light sources 120. The surface of the quantum tube 130 adjacent to the light sources 120 is employed to be an incident surface of the quantum tube 130 where the first light is incident, and the surface of the quantum tube 130 away from the light sources 120 is the illuminating surface of the quantum tube 130. Thus, the second tape 150 is located on the illuminating surface of the quantum tube 130. By locating the second tape 150 on the surface of the quantum tube 130 away from the light sources 120, as the light bar 100 is applied in the backlight module, the second tape 150 can fix the quantum tube 130 with the light guide plate in the backlight module to prevent the movement between the quantum tube 130 and the light guide plate in the backlight module and to increase the incidence rate of the second light emitted from the light bar 100 entering the light guide plate in the backlight module.

The light bar 100 comprises a plurality of silk screens 160, and the silk screens 160 are located at edges of the circuit board 110, and each silk screen 160 is located corresponding to the light source 120. The silk screens 160 are employed for preventing the Hotspot phenomenon. The Hotspot phenomenon is that in the display area, as the distance between the adjacent light sources is larger, the dark and bright alternation phenomenon appears at the lighting portion of the image close to the display apparatus frame. In this embodiment, the silk screens 160 are black silk screens.

The light bar 100 of this embodiment fixes the quantum tube 130 on the circuit board 110 with the first tape 140. The detachment of the quantum tube 130 is convenient while fixing the quantum tube 130 for rework and reassembly when issues occur to the light bar 100.

Figure 5:
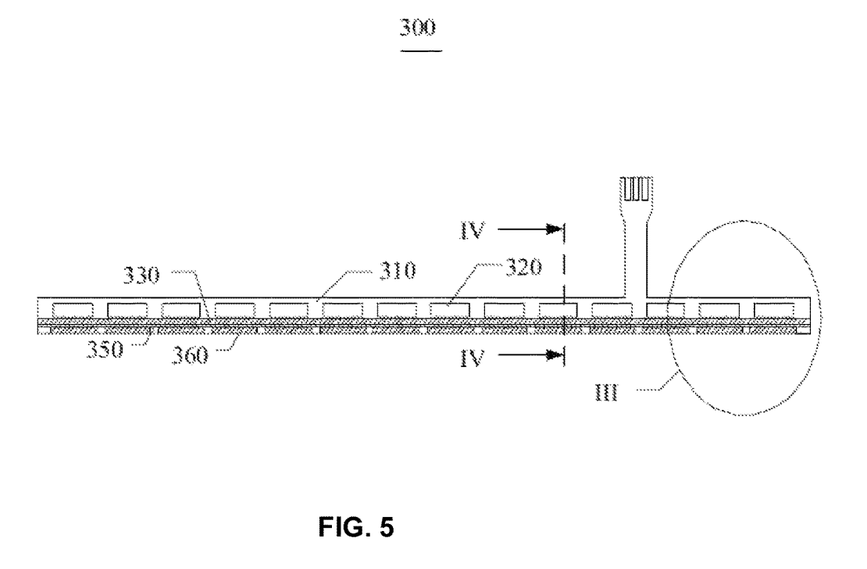
FIG. 5 is a structural diagram of a light bar according to another preferred embodiment of the present invention.
Figure 6:
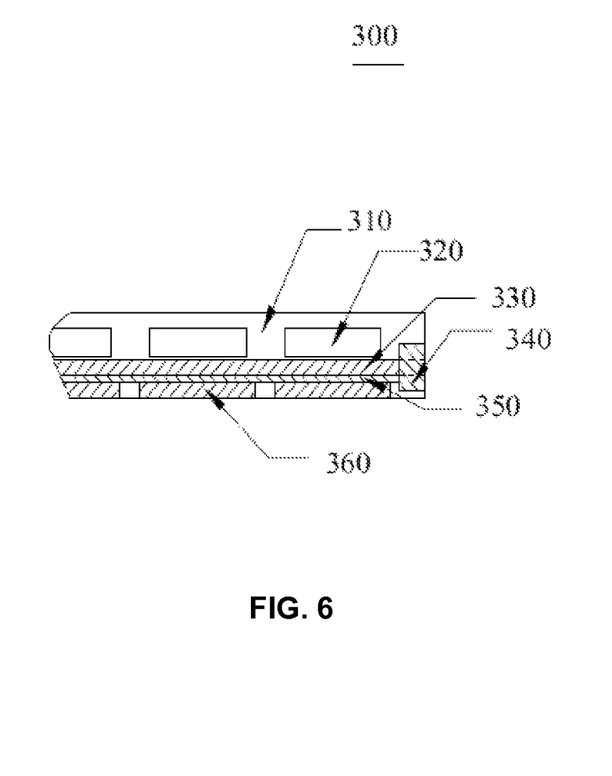
FIG. 6 is a partially enlarged structure diagram in III position in FIG. 5.
Figure 7:
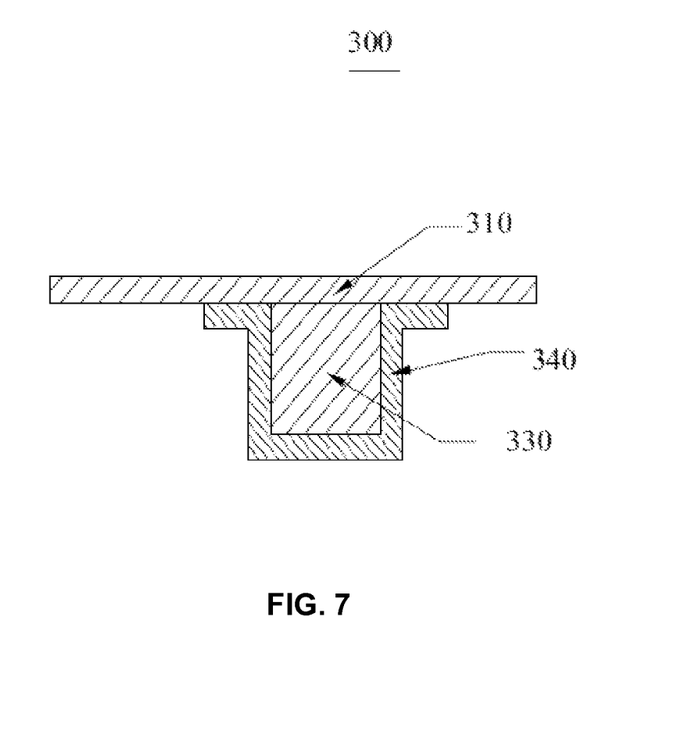
FIG. 7 is a sectional structure diagram along the IV-VI line in FIG. 5.

The following is an introduction for the light bar according another preferred embodiment of the present invention. Please refer to FIG. 5, FIG. 6 and FIG. 7. FIG. 5 is a structural diagram of a light bar according to another preferred embodiment of the present invention; FIG. 6 is a partially enlarged structure diagram in III position in FIG. 5; FIG. 7 is a sectional structure diagram along the IV-VI line in FIG. 5. The light bar 300 comprises a circuit board 310, a plurality of light sources 320, a quantum tube 330 and a first tape 340. The circuit board 310 is employed to generate a control signal, and the light sources 320 are located on the circuit board 310 and electrically connected to the circuit board 310, and the light sources 320 generate a first light under control of the control signal, and the first light emitted from the light sources 320 exits through an illuminating surface of the light sources 320. The quantum tube 330 is located adjacent to the illuminating surface of the light sources 320 and the quantum tube 330 is fixed and connected with the circuit board 310 with the first tape 340, and the quantum tube 330 is employed to convert the first light emitted from the light sources 320 into a second light.

The circuit board 310 can be a printed circuit board or a flexible circuit board. The circuit board 310 can support and fix the light sources 320 while providing the control signal for the light sources 320.

The light sources 320 are located on the circuit board 310. Preferably, the light sources 320 are aligned in a straight line. The interval between adjacent light sources 320 are squally distributed. Thus, the first light emitted from the light sources 320 can be mixed more uniform as entering the quantum tube 330.

Figure 8:
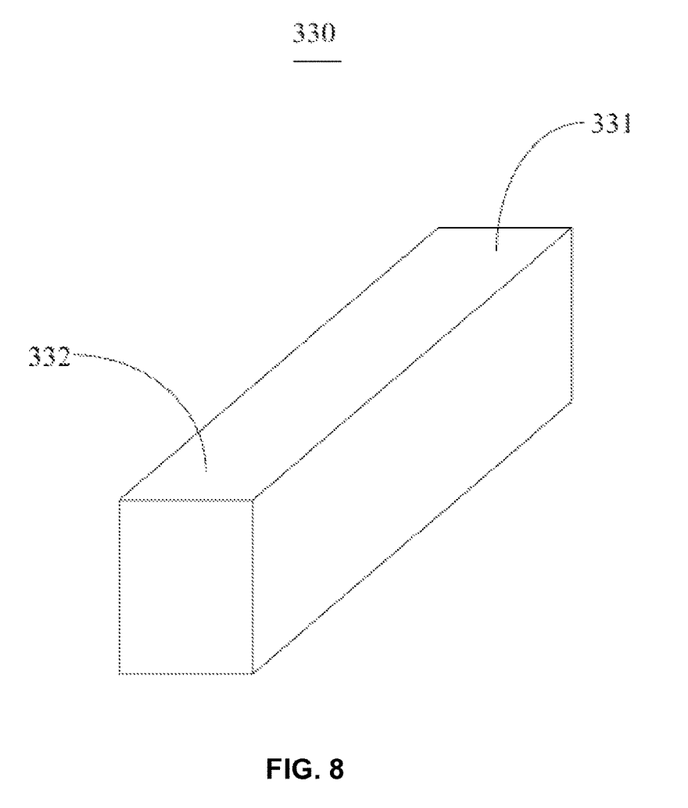
FIG. 8 is a structural diagram of a quantum tube according to another preferred embodiment of the present invention.

Please refer to FIG. 8. FIG. 8 is a structural diagram of a quantum tube according to another preferred embodiment of the present invention. In this embodiment, the quantum tube 130 comprises a first end 331 and a second end 332 which are oppositely located. The section of the quantum tube 330 along the first end 331 or the second end 332 is rectangular. Correspondingly, the first tape 340 is a single-side tape. The first tape is located corresponding to the first end 331 and the second end 332 of the quantum tube 330, and an adhesive side of the first tape 340 surrounds a surface of the quantum tube 330 away from the illuminating surface of the light sources 320 and is attached and fixed on the circuit board 310. In this embodiment, an adhesive side of the first tape 340 surrounds a surface of the quantum tube 330 away from the illuminating surface of the light sources 320 and is attached and fixed on the circuit board 310. The usage amount of the first tape 340 can be reduced while the quantum tube 330 is fixed on the circuit board 310. Furthermore, the first tape 310 is located at the opposite first end 331 and second end 332 of the quantum tube 330 so that the detachment of the quantum tube 330 is convenient for rework and reassembly when issues occur to the light bar 300.

It is understandable that in this embodiment, rectangle is illustrated for being the sectional appearance of the quantum tube 330 but the appearance of the quantum tube 330 is not restricted to be rectangle. In other embodiments, the appearance of the quantum tube 130 can be one of semicircle, triangle and U shape.

Preferably, a gap is arranged between the illuminating surface of the light sources 320 and the quantum tube 330 to make that the light emitted from the illuminating surface of the light sources 320 is incident into the quantum tube 330 after light mixture.

In this embodiment, the light sources 320 are blue light emitting diodes, and the first light emitted by the light sources 320 is blue light, and the first light is employed to excite the quantum tube 330 to generate red, green lights, and the blue light emitted by the light sources 320 and the red, green lights generated by exciting the quantum tube 330 are mixed to generate the second light which is white light.

Preferably, the light bar 300 further comprises a second tape 350, and the second tape 350 is a double-side tape, and the second tape 350 is located on a surface of the quantum tube 330 away from the light sources 320. The surface of the quantum tube 330 adjacent to the light sources 320 is employed to be an incident surface of the quantum tube 330 where the first light is incident, and the surface of the quantum tube 330 away from the light sources 320 is the illuminating surface of the quantum tube 330. Thus, the second tape 350 is located on the illuminating surface of the quantum tube 330. By locating the second tape 350 on the surface of the quantum tube 330 away from the light sources 320, as the light bar 300 is applied in the backlight module, the second tape 350 can fix the quantum tube 330 with the light guide plate in the backlight module to prevent the movement between the quantum tube 330 and the light guide plate in the backlight module and to increase the incidence rate of the second light emitted from the light bar 300 entering the light guide plate in the backlight module.

The light bar 300 comprises a plurality of silk screens 360, and the silk screens 360 are located at edges of the circuit board 310, and each silk screen 3160 is located corresponding to the light source 320. The silk screens 360 are employed for preventing the Hotspot phenomenon. The Hotspot phenomenon is that in the display area, as the distance between the adjacent light sources is larger, the dark and bright alternation phenomenon appears at the lighting portion of the image close to the display apparatus frame. In this embodiment, the silk screens 360 are black silk screens.

The present invention further provides a backlight module. The backlight module comprises the light bar 100 or light bar 300 in the aforesaid respective embodiments. The details of the light bar 100 and light bar 300 can be referred to the previous descriptions. The repeated description is omitted here.

Above are embodiments of the present invention, which does not limit the scope of the present invention. Any modifications, equivalent replacements or improvements within the spirit and principles of the embodiment described above should be covered by the protected scope of the invention.

What is claimed is:

1. A light bar, comprising a circuit board, a plurality of light sources, a quantum tube and a first tape, wherein the circuit board has a top surface and generates a control signal, and the light sources are located on the top surface of the circuit board and electrically connected to the circuit board, and the light sources generate first light under control of the control signal, and the first light emitted from the light sources exits through an illuminating surface of the light sources, and the quantum tube is located adjacent to the illuminating surface of the light sources and the quantum tube is fixed and connected with the top surface of the circuit board with the first tape, and the quantum tube is employed to convert the first light emitted from the light sources into second light;

wherein the quantum tube is adhesively attached to the first tape and the first tape has an adhesion surface that is adhesively attached to the circuit board through adhesive surface engagement therebetween so as to fix and connect the quantum tube to the top surface of the circuit board such that the quantum tube and the light sources are both mounted to the top surface of the circuit board and the quantum tube is spaced from the light sources by a gap that is formed of a void space between the quantum tube and the light sources; and wherein the first tape is a single-side tape and the quantum tube comprises a first end and a second end which are oppositely located, wherein the adhesion surface of the first tape is arranged to continuously extend along and adhesively adhere with a first part of an outer circumference of the quantum tube at each of the first and second ends of the quantum dot so as to attach the first and second ends of the quantum tube to the top surface of the circuit board with a remaining, second part of the outer circumference of the quantum tube positioned against the top surface of the circuit board.

2. The light bar according to claim 1, wherein the light sources are blue light emitting diodes, and the first light is blue light, and the first light is employed to excite the quantum tube to generate red, green lights, and the blue light emitted by the light sources and the red, green lights generated by exciting the quantum tube are mixed to generate the second light which is white light.

3. The light bar according to claim 1, wherein the light bar further comprises a second tape, and the second tape is a double-side tape, and the second tape is located on a surface of the quantum tube away from the light sources.

4. The light bar according to claim 1, wherein an appearance of the quantum tube is one of semicircle, triangle and rectangle.

5. The light bar according to claim 1, wherein the light bar comprises a plurality of silk screens, and the silk screens are located at edges of the circuit board, and each silk screen is located corresponding to the light source.

6. A backlight module, comprising a light bar, wherein the light bar comprises a circuit board, a plurality of light sources, a quantum tube and a first tape, and the circuit board has a top surface and generates a control signal, and the light sources are located on the top surface of the circuit board and electrically connected to the circuit board, and the light sources generate first light under control of the control signal, and the first light emitted from the light sources exits through an illuminating surface of the light sources, and the quantum tube is located adjacent to the illuminating surface of the light sources and the quantum tube is fixed and connected with the top surface of the circuit board with the first tape, and the quantum tube is employed to convert the first light emitted from the light sources into second light;

wherein the quantum tube is adhesively attached to the first tape and the first tape has an adhesion surface that is adhesively attached to the circuit board through adhesive surface engagement therebetween so as to fix and connect the quantum tube to the top surface of the circuit board such that the quantum tube and the light sources are both mounted to the top surface of the circuit board and the quantum tube is spaced from the light sources by a gap that is formed of a void space between the quantum tube and the light sources; and wherein the first tape is a single-side tape and the quantum tube comprises a first end and a second end which are oppositely located, wherein the adhesion surface of the first tape is arranged to continuously extend along and adhesively adhere with a first part of an outer circumference of the quantum tube at each of the first and second ends of the quantum dot so as to attach the first and second ends of the quantum tube to the top surface of the circuit board with a remaining, second part of the outer circumference of the quantum tube positioned against the top surface of the circuit board.

7. The backlight module according to claim 6, wherein the light sources are blue light emitting diodes, and the first light is blue light, and the first light is employed to excite the quantum tube to generate red, green lights, and the blue light emitted by the light sources and the red, green lights generated by exciting the quantum tube are mixed to generate the second light which is white light.

8. The backlight module according to claim 6, wherein the light bar further comprises a second tape, and the second tape is a double-side tape, and the second tape is located on a surface of the quantum tube away from the light sources.

9. The backlight module according to claim 6, wherein an appearance of the quantum tube is one of semicircle, triangle and rectangle.

10. The backlight module according to claim 6, wherein the light bar comprises a plurality of silk screens, and the silk screens are located at edges of the circuit board, and each silk screen is located corresponding to the light source.

* * * * *